United States Patent Office

3,308,086
Patented Mar. 7, 1967

3,308,086
ETHYLENE COPOLYMERS WITH VINYL ESTERS PLASTICIZED WITH PHOSPHATE AND CARBOXYLIC ESTERS
Lloyd H. Wartman, Charleston, W. Va., assignor to Union Carbide Corporation, a corporation of New York
Filed Aug. 30, 1963, Ser. No. 305,787
7 Claims. (Cl. 260—30.6)

This invention relates to plasticized polymeric materials. It is particularly related to novel compositions that are plasticized copolymers of ethylene with vinyl esters.

The production of low-stiffness polyethylene by the basic high temperature, high pressure polymerization processes disclosed in U.S. Patent 2,153,553 is well known. Polyethylene materials produced by this method are characterized, inter alia, by having a relatively low stiffness, of the order of about 14,000 p.s.i., or lower. This is in contrast to the polyethylenes produced by the low temperature, low pressure methods wherein the stiffness of the resulting polyethylene is as high as about 160,000 p.s.i., or higher.

Low stiffness polyethylene has numerous industrial applications. For example, it has been used in the production of laminated plastics, flexible films, wrapping films, squeeze bottles and containers, molded and extruded articles, and a host of other applications. In a great many applications, however, it is desirable to employ polyethylene or "polyethylene-like" plastic compositions which have much lower stiffness, and which are considerably more resilient than the polyethylenes produced by the high temperature, high pressure methods.

Attempts to plasticize polyethylene itself have been unsuccessful due to the incompatibility of plasticizers with polyethylene and the exudation or so-called "sweat-out" of the plasticizer from the resin upon standing, even at room temperature. Copolymerization of ethylene with a host of monomeric organic compounds has provided a partial answer, but this method has several drawbacks and limitations. One drawback of this method is the inability of some of the monomeric organic compounds to copolymerize with ethylene. Another drawback is that large quantities of the comonomer are often necessary to produce a copolymer which has the requisite low degree of stiffness and high resiliency. In view of the inherent difficulties associated with copolymerization processes, increased comonomer concentration decreases the productivity of a given polymerization reactor, hence lowering the yield of the copolymer. Still another limitation of this method is the fact that most of the commercially desirable comonomers are considerably more expensive than ethylene. Consequently, the resulting copolymer is produced at a cost too high for use in a competitive market.

It has now been discovered that homogeneous, low-stiffness "polyethylene-like" plastic compositions can be produced which do not have the deficiencies known to be present in the plasticized polyethylene compositions heretofore available. This has been accomplished by incorporating a limited class of certain plasticizers, which will hereinafter be defined, with the copolymers of ethylene with vinyl esters containing from about 5 to about 30 weight percent, preferably from about 12 to about 25 weight percent of vinyl esters.

According to this invention, the copolymer and the plasticizer are admixed by known means for a sufficient period of time to insure complete incorporation of the plasticizer into the copolymer so as to produce a homogeneous composition. The use of the specific plasticizers of this invention lowers the stiffness of the copolymer and increases its resiliency without the need for using large quantities of the comonomer in producing the copolymer, therefore obviating the drawbacks and limitations which were referred to previously.

The copolymers which are employed to produce the plasticized compostions of this invention are: copolymers of ethylene with vinyl esters of the formula:

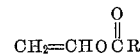

wherein R is a hydrogen or an alkyl group containing 1 to 10 carbon atoms, preferably 1 to 4 carbon atoms.

Exemplary vinyl ester monomers are vinyl formate, vinyl acetate, vinyl propionate, vinyl butyrate, etc. It was observed that as the number of carbon atoms in the alkyl group increases the compatibility of a given plasticizer with the ethylene vinyl ester copolymer decreases and a larger vinyl ester concentration in the copolymer is needed to achieve adequate compatibility of the plasticizer with the copolymer.

One class of plasticizers which can be employed in the present invention is represented by the formula:

wherein X is an alkyl group containing 3 to 14 carbon atoms, preferably 4 to 12 carbon atoms, X' is an alkyl group having 3 to 14 carbon atoms or an aralkyl group such as, for example a benzyl group, and R" represents an alkylene, cycloalkylene or an arylene group.

Another class of plasticizers which has been found effective in producing the plasticized compositions of this invention is the alkyl phosphates having the general formula:

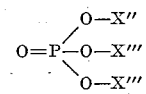

wherein X" is an alkyl group containing 4 to 12 carbon atoms, X"' represents an alkyl group containing 4 to 12 carbon atoms; aryl group containing up to 10 carbon atoms, such as phenyl and naphthyl; alkaryl group such as alkyl substituted benzene and alkyl substituted naphthalene wherein the alkyl constituent contains 1 to 8 carbon atoms and wherein the benzene and naphthalene are substituted in at least one position; aralkyl such as benzyl; cycloalkyl containing 3 to 8 carbon atoms, such as, for example, cyclopropyl, cyclopentyl, cyclohexyl, etc.

Thus, alkylphthalates such as, for example, di(2-ethylhexyl)phthalate, butyl ethylhexyl phthalate, didecylphthalate, butyl benzyl phthalate, etc., alkyl hexahydrophthalates such as, for example, di(2-ethylhexyl)hexahydrophthalate; alkyl adipates such as, for example, di(2-ethylhexyl)adipate, didecyl adipate, etc., dialkyl azelate such as, for example, didecyl azelate; alkyl phosphates such as, for example, tri(2-ethylhexyl)phosphate, 2-ethylhexyldiphenyl phosphate, etc., are typical of suitable plasticizers which can be employed for plasticizing ethylene copolymers of the type enumerated previously.

With respect to these plasticizers it should be pointed out that they are generally characterized by their unexpected high degree of compatibility with the said copolymers and their stability and non-volatility from the plasticized copolymer compositions. The choice as well as quantity of plasticizer which is used depend, inter alia, upon the concentration of the comonomer in the copolymer, the degree of compatibility of the plasticizer with the copolymer, the chemical composition of the plasticizer and the desired stiffness of the plasticized copolymer composition. A judicious selection of the plasticizer, therefore, depends upon the foregoing considerations and can be readily determined by one skilled in the art from the teachings herein. It is of course preferable to use a plasticizer which is highly compatible with the copolymer and which is effective when used in small quantities.

In most cases the concentration of the plasticizer can be as high as about 60 PHR (parts plasticizer per 100 parts of resin), preferably ranging from about 5 to about 40 PHR.

The ranges of compatibility of some of the plasticizers suitable for use with ethylene-vinyl acetate copolymers of varying vinyl acetate content are illustrated in FIGURES 1–8, wherein the percent by weight of vinyl acetate in the copolymer are plotted as the ordinate and the parts by weight of the plasticizer per 100 parts of ethylene-vinyl acetate resin (hereinafter referred to as PHR) are plotted as the abscissa. Thus:

Figure 1:
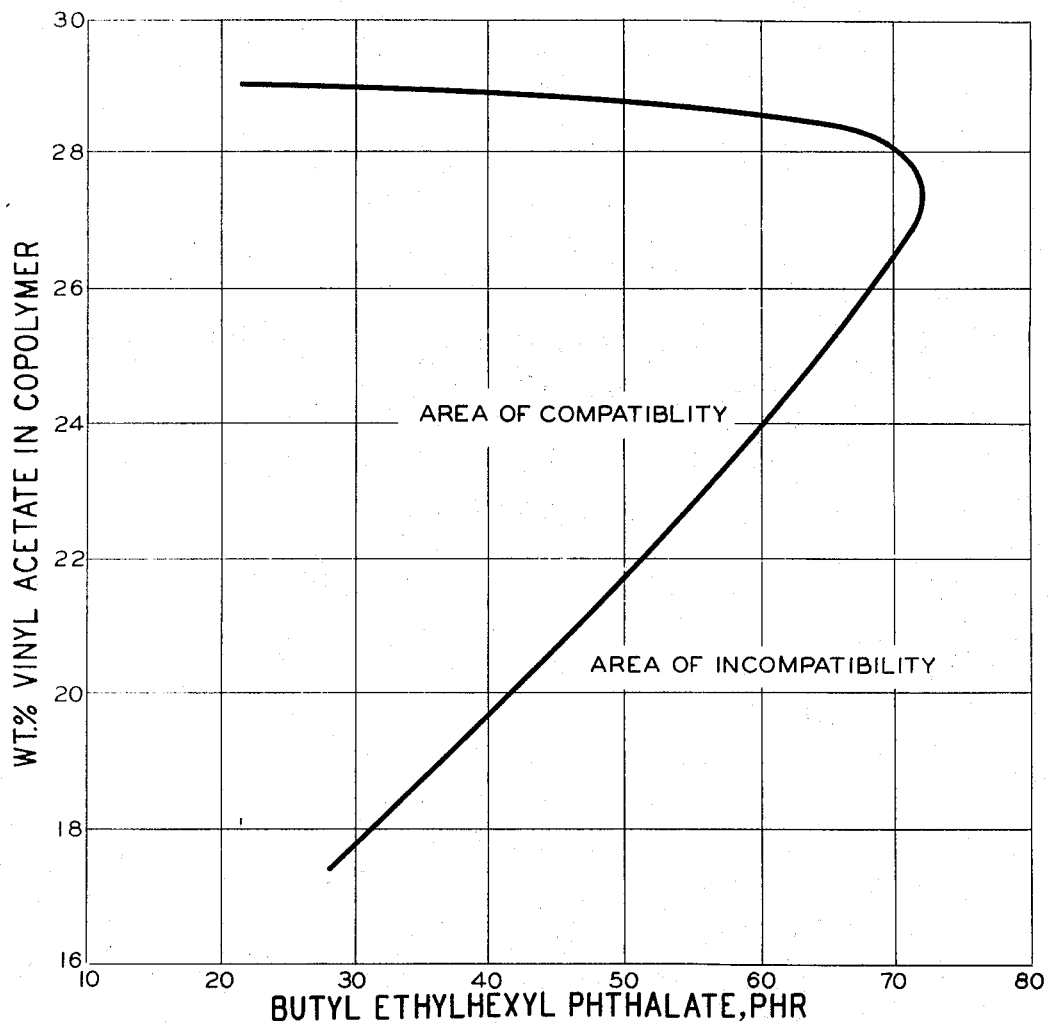
FIGURE 1 is a plot showing the compatibility of butyl ethylhexyl phthalate in ethylene-vinyl acetate copolymers as the concentration of the vinyl acetate is increased.
Figure 2:
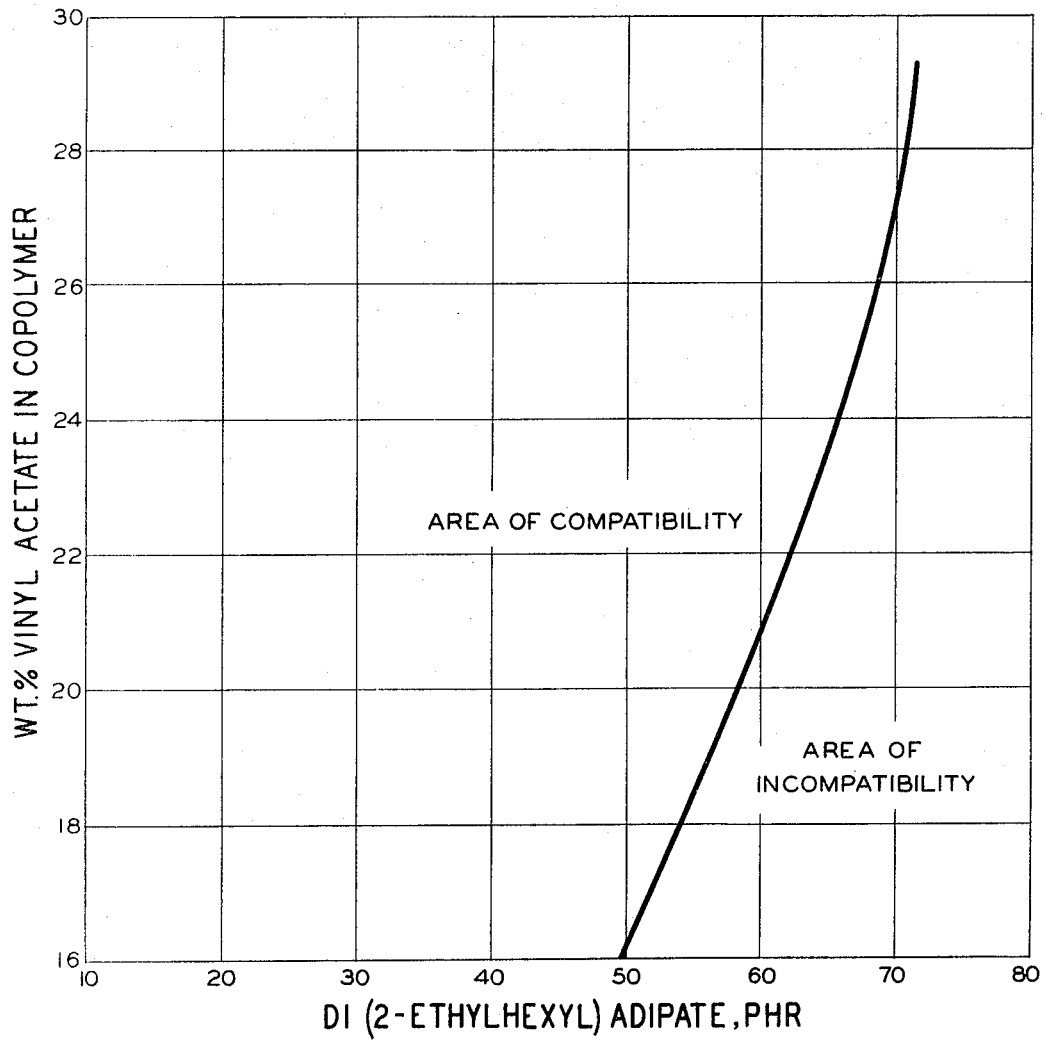
FIGURE 2 is a plot showing the compatibility of di(2-ethylhexyl)adipate in ethylene-vinyl acetate copolymers as the concentration of vinyl acetate is increased.
Figure 3:
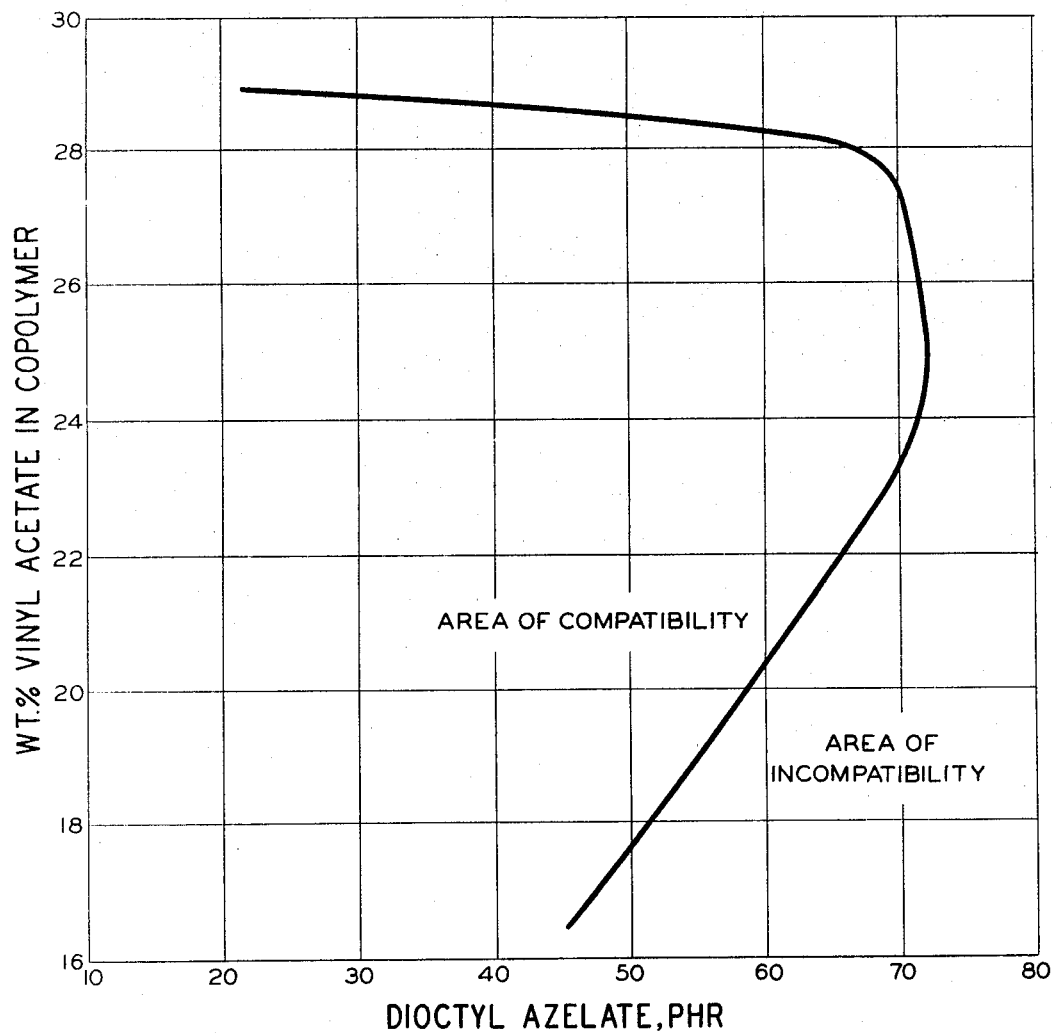
FIGURE 3 is a plot showing the compatibility of dioctyl azelate in ethylene-vinyl acetate copolymers as the concentration of vinyl acetate is increased.
Figure 4:
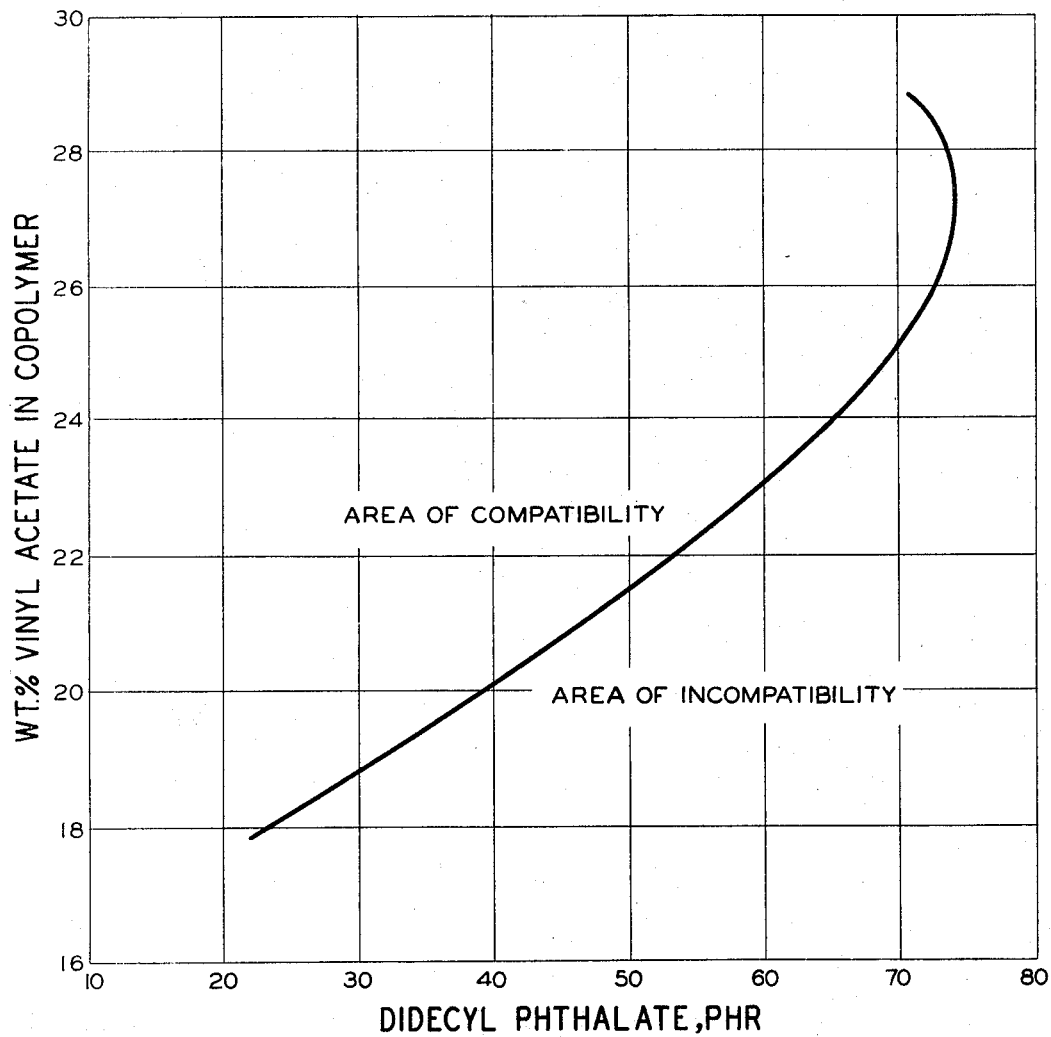
FIGURE 4 is a plot showing the compatibility of didecyl phthalate in ethylene-vinyl acetate copolymers as the concentration of vinyl acetate is increased.
Figure 5:
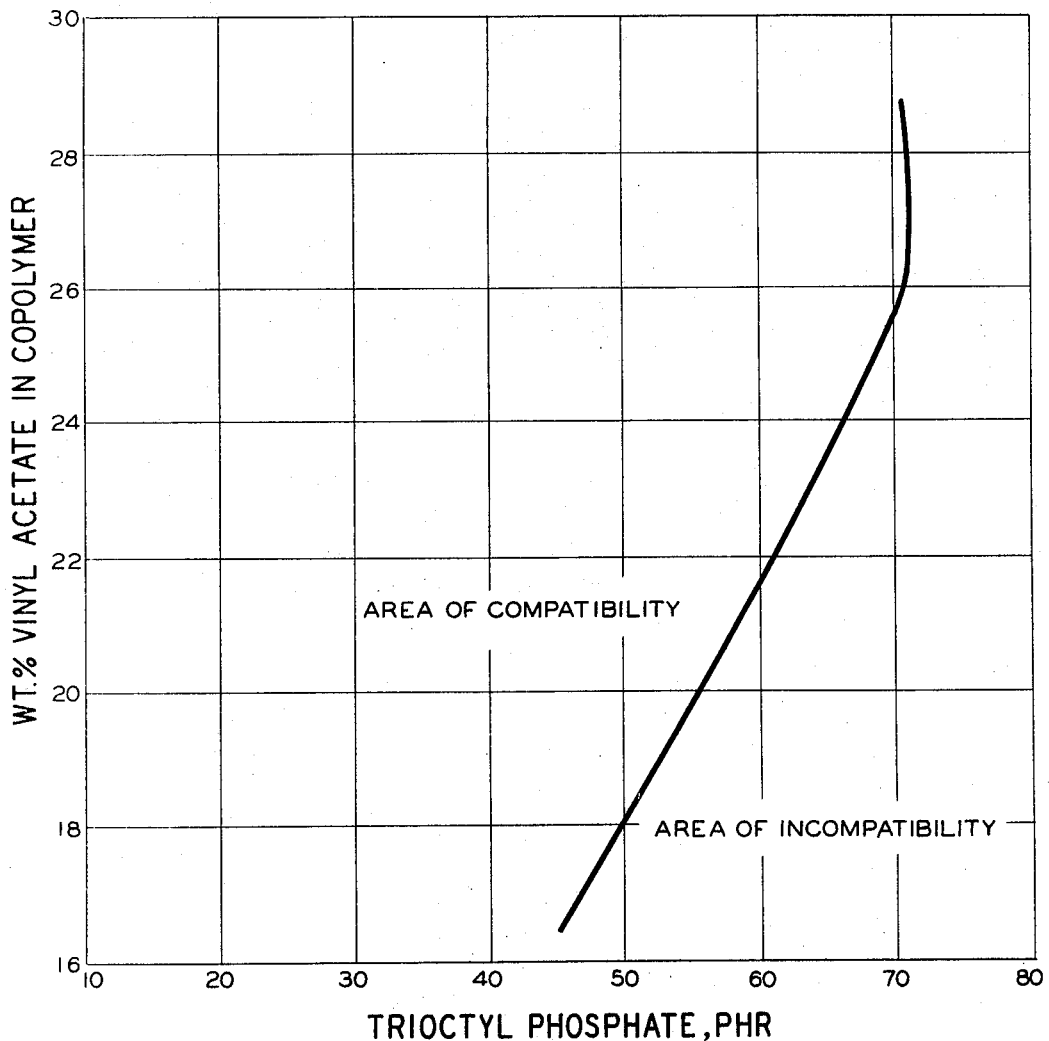
FIGURE 5 is a plot showing the compatibility of trioctyl phosphate in ethylene-vinyl acetate copolymers as the concentration of vinyl acetate is increased.
Figure 6:
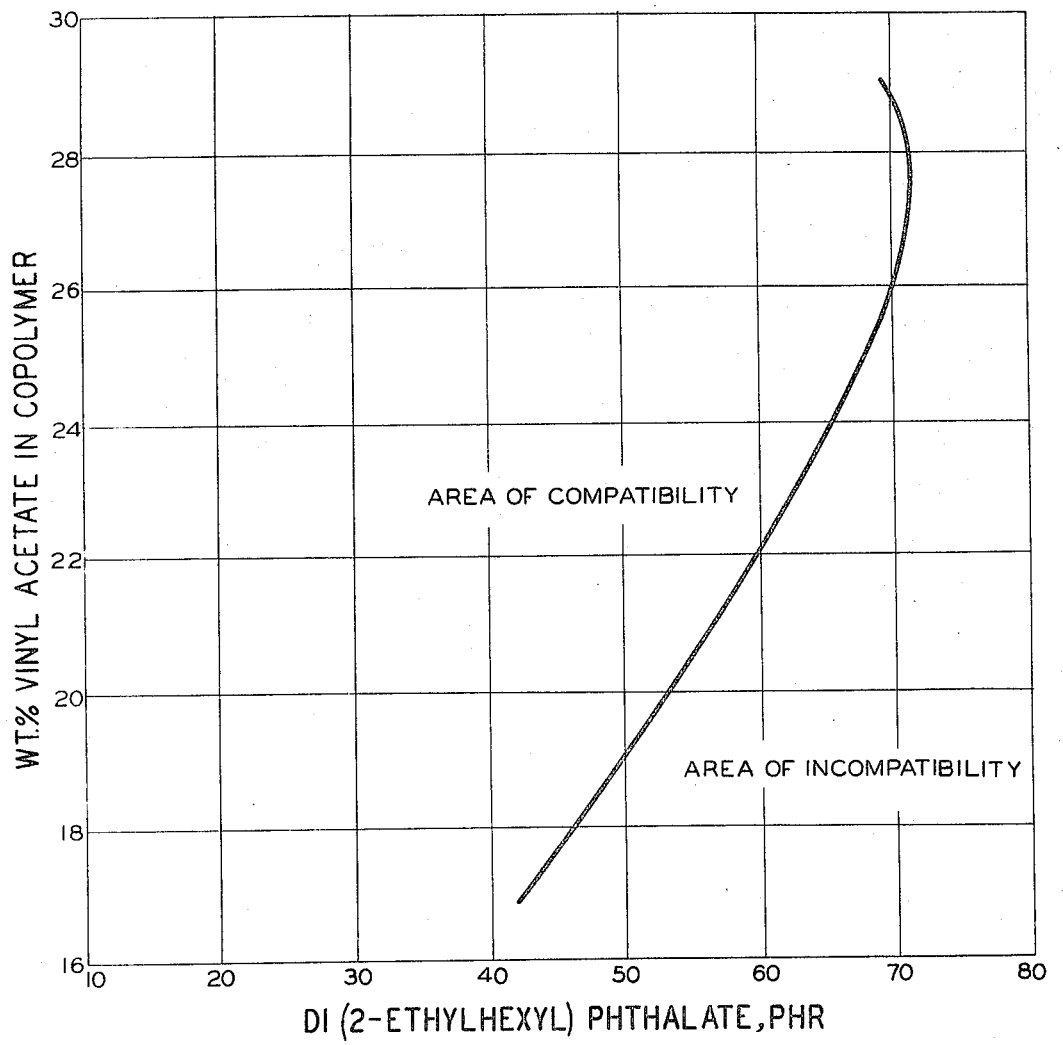
FIGURE 6 is a plot showing the compatibility of di(2-ethylhexyl)phthalate in ethylene-vinyl acetate copolymers as the concentration of vinyl acetate is increased.
Figure 7:
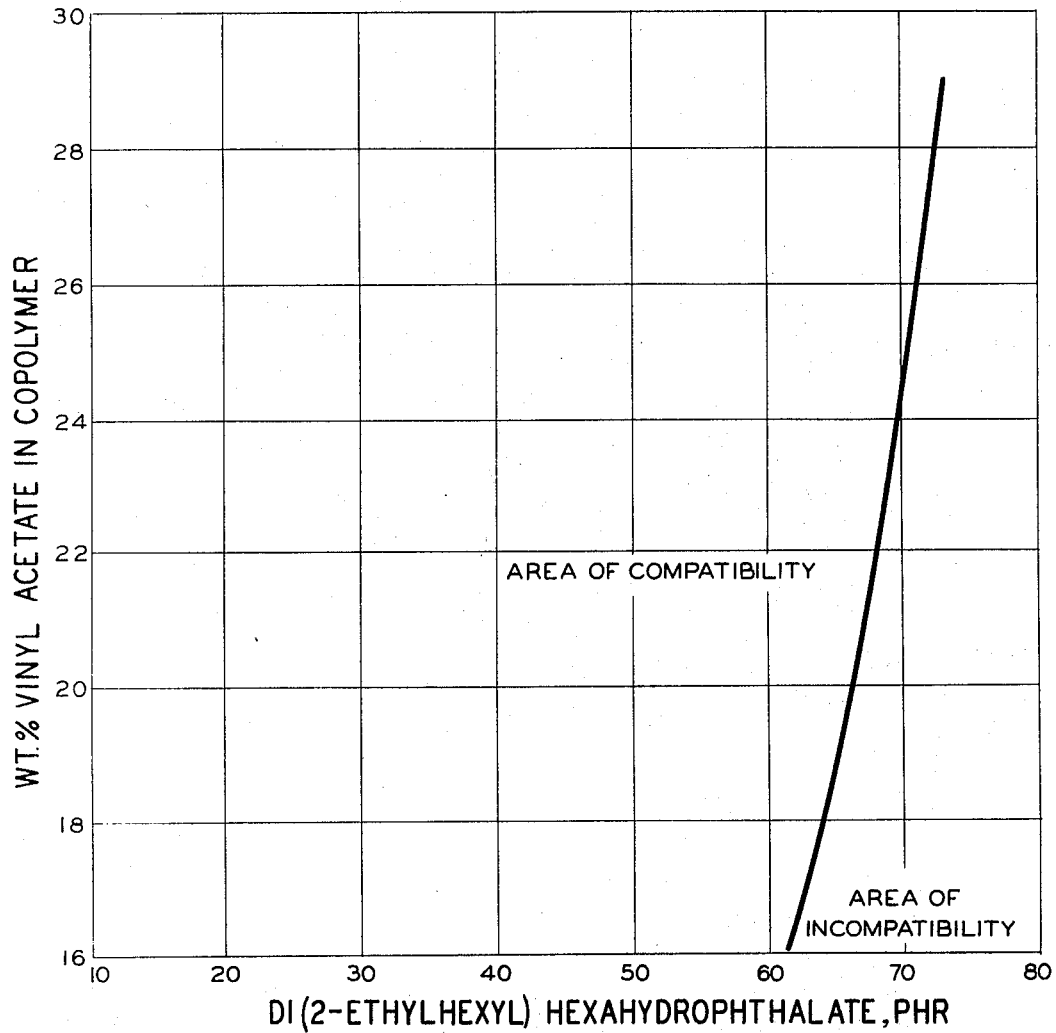
FIGURE 7 is a plot showing the compatibility of di(2-ethylhexyl)hexahydrophthalate in ethylene-vinyl acetate copolymers as the concentration of vinyl acetate is increased.
Figure 8:
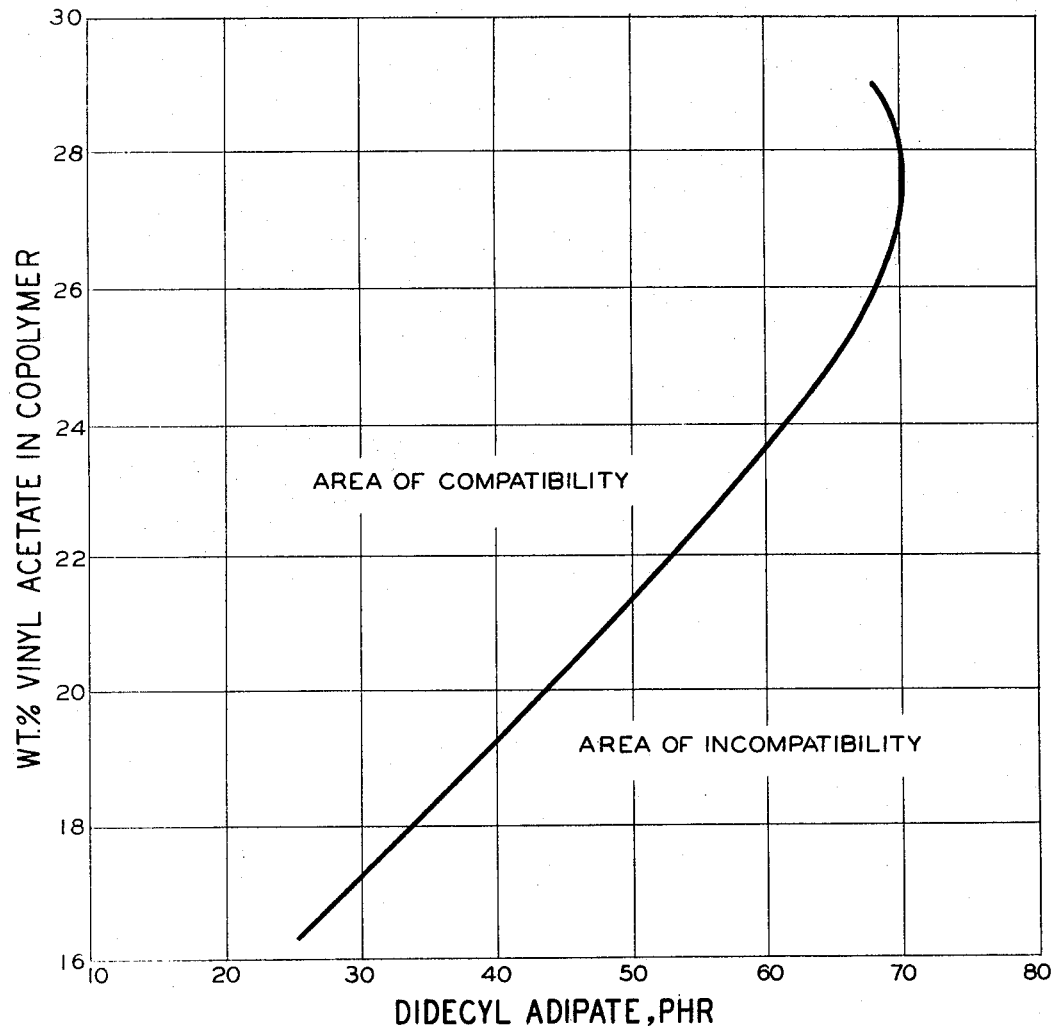
FIGURE 8 is a plot showing the compatibility of didecyl adipate in ethylene-vinyl acetate copolymers as the concentration of vinyl acetate is increased.

The areas of compatibility and non-compatibility of the plasticizer with the copolymer are clearly shown in these figures. Thus, for example, in FIGURE 1, when the concentration of the vinyl acetate in the copolymer is 22 percent, the concentration of the plasticizer should be lower than 51 PHR as determined from the graph. Similar curves may be prepared using other plasticizers, as herein defined in the same or in other copolymer compositions.

With respect to FIGURES 1–8, it should be pointed out that these curves were constructed by visual examination of the plasticized compositions to determine the exudation (sweat-out) of the plasticizer from the plasticized copolymer compositions after aging for two weeks at room temperature of about 25° C. It is therefore preferable to employ the plasticizer at a lower concentration than the maximum that can be tolerated. Thus, referring again to FIGURE 1, when the concentration of vinyl acetate in the copolymer is 22 weight percent, the concentration of the plasticizer should preferably be selected at a maximum of about 45 PHR to insure that there will be no subsequent exudation of the plasticizer from the plasticized composition. The selection of the most desirable concentration of a particular plasticizer for each copolymer composition can be readily determined by those skilled in the art from similar graphs.

The method of incorporating the plasticizer in the copolymer is not narrowly critical. Any one of the conventional methods can be resorted to for this purpose. Thus, a two-roll mill, a Banbury mixer, an ordinary vessel equipped with a suitable blender, and a single or a double screw extruder are all suitable for effective mixing and blending of the plasticizer into the copolymer. Using a two-roll mill, for example, the copolymer and the plasticizer may be mixed and fluxed thereon for a sufficient period of time to insure complete mixing and incorporation of the plasticizer and the copolymer.

Although the plasticizer and the copolymer can be blended at ambient temperatures, elevated temperatures, say about 100° to 150° C. are preferred to obtain a homogeneous composition. It has been found that blending on a two-roll mill which has been heated to about 100° C. results in a plasticized copolymer composition which is less opaque than a similar plasticized composition which has been blended on a two-roll mill at ambient temperatures.

The following examples illustrate the methods of preparing plasticized compositions of copolymers of ethylene with vinyl acetate, which contains 16.7 percent by weight of polymerized vinyl acetate based on the weight of the copolymer, with various plasticizers. The properties of the plasticized copolymer compositions together with the corresponding properties of the unplasticized copolymer (control sample) are shown in Table I which follows these examples.

EXAMPLE 1

A mixture consisting of a copolymer of ethylene and vinyl acetate containing 16.7 percent by weight polymerized vinyl acetate, and 6 parts of di(2-ethylhexyl) phthalate plasticizer per 100 parts of the copolymer was blended to produce a homogeneous plasticized composition as follows:

The copolymer was first fluxed on a two-roll mill which had been heated to 100° C. After a period of approximately 2 minutes the plasticizer was added and fluxed with the copolymer until the plasticizer was completely mixed with and incorporated in the copolymer as determined visually. The plasticized copolymer composition was then stripped from the mill and its properties determined. The physical properties of the compositions are shown in Table I.

EXAMPLES 2 AND 3

The procedure of Example 1 was followed using the same plasticizer and copolymer except that quantity of plasticizer was increased to 19 and 31 PHR, respectively. Homogeneous compositions were produced in both instances. The physical properties of the composition are shown in Table I.

EXAMPLES 4, 5 AND 6

Following the procedure set forth in Example 1, but using di(2-ethylhexyl)hexahydrophthalate as the plasticizer, the ethylene-vinyl acetate copolymer of Example 1 was plasticized with 6, 19 and 31 PHR of the plasticizer respectively. The properties of the homogeneous plasticized copolymer compositions are shown in Table I.

EXAMPLES 7, 8 AND 9

The procedure of Example 1 was repeated using 6, 19 and 31 PHR of di(2-ethylhexyl)adipate as the plasticizer. The properties of the homogeneous plasticized copolymer composition are also shown in Table I.

TABLE I

| Example | Plasticizers Name | Quantity PHR | Tensile Strength, p.s.i.[1] | Elongation,[2] Percent | Stiffness,[3] p.s.i. | Sweat-Out[4] |
|---|---|---|---|---|---|---|
| Control | No Plasticizer Used | | 1,160 | 820 | 3,800 | |
| 1 | Di(2-ethylhexyl)phthalate | 6 | 735 | 715 | 2,700 | None. |
| 2 | ----do---- | 19 | 630 | 665 | 2,200 | Do. |
| 3 | ----do---- | 31 | 395 | 395 | 1,400 | Do. |
| 4 | Di(2-ethylhexyl)hexahydrophthalate | 6 | 735 | 650 | 2,900 | Do. |
| 5 | ----do---- | 19 | 560 | 630 | 2,100 | Do. |
| 6 | ----do---- | 31 | 455 | 615 | 1,600 | Do. |
| 7 | Di(2-ethylhexyl)adipate | 6 | 705 | 630 | 3,000 | Do. |
| 8 | ----do---- | 19 | 520 | 545 | 2,200 | Do. |
| 9 | ----do---- | 31 | 440 | 435 | 1,900 | Do. |

[1] ASTM Test D638-58T.
[2] ASTM Test D638-58T.
[3] ASTM Test D882-56T.
[4] Observed after aging for 2 weeks at room temperature.

The data in Table I clearly establishes that the plasticized copolymer compositions of this invention are more resilient and have a lower stiffness than the corresponding unplasticized copolymer.

What is claimed is:

1. The novel homogeneous plasticized compositions of (i) a copolymer of ethylene and a vinyl ester of the formula:

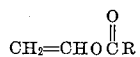

wherein R is selected from the group consisting of hydrogen and alkyl containing 1 to 10 carbon atoms; and (ii) a plasticizer selected from the group consisting of compounds of the formula

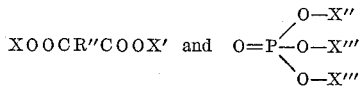

wherein X is alkyl containing 3 to 14 carbon atoms, X' is selected from the group consisting of alkyl having 3 to 14 carbon atoms and aralkyl, R" is selected from the group consisting of alkylene, cycloalkylene and arylene, X" is alkyl containing 4 to 12 carbon atoms and X''' is selected from the group consisting of alkyl containing 4 to 12 carbon atoms, cycloalkyl containing 1 to 8 carbon atoms, aryl of up to 10 carbon atoms, alkaryl and aralkyl.

2. The homogeneous plasticized composition as claimed in claim 1 wherein said copolymer contains from about 5 to about 30 weight percent polymerized vinyl ester.

3. The homogeneous plasticized composition as claimed in claim 1 wherein said vinyl ester is vinylacetate.

4. The homogeneous plasticized composition as claimed in claim 1 wherein the concentration of the plasticizer is from about 5 to about 60 parts per 100 parts of the resin.

5. A novel homogeneous plasticized composition of (i) a copolymer of ethylene and vinyl ester of the formula:

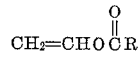

wherein R is selected from the group consisting of hydrogen and alkyl containing 1 to 10 carbon atoms; and (ii) a plasticizer selected from the group consisting of alkyl phthalate, alkyl hexahydrophthalate, alkyladipate, alkyl azelte, and alkyl phosphate wherein the alkyl group contains 3 to 14 carbon atoms.

6. The homogeneous plasticized composition as claimed in claim 5 wherein said vinyl ester is vinyl acetate.

7. The homogeneous plasticized composition as claimed in claim 5 wherein the concentration of the plasticizer is from about 5 to about 60 parts per 100 parts of the resin.

References Cited by the Examiner

UNITED STATES PATENTS

| | | | |
|---|---|---|---|
| 3,025,167 | 3/1962 | Butler | 99—171 |
| 3,126,355 | 3/1964 | Birten et al. | 260—30.6 |
| 3,215,678 | 11/1965 | Adelman | 260—28.5 |

MORRIS LIEBMAN, *Primary Examiner.*

A. H. KOECKERT, *Assistant Examiner.*

Dedication 3,308,086.—*Lloyd H. Wartman*, Charleston, W. Va. ETHYLENE COPOLYMERS WITH VINYL ESTERS PLASTICIZED WITH PHOSPHATE AND CARBOXYLIC ESTERS. Patent dated Mar. 7, 1967. Dedication filed June 18, 1970, by the assignee, *Union Carbide Corporation*.

Hereby dedicates the remainder of the term of the patent to the Public.
[*Official Gazette November 10, 1970.*]